United States Patent
Yan et al.

(10) Patent No.: US 9,626,223 B2
(45) Date of Patent: Apr. 18, 2017

(54) PROVISIONING IAAS SERVICES

(75) Inventors: Shi Xing Yan, Singapore (SG); Guopeng Zhao, Singapore (SG); Ding Ma, Singapore (SG); Bu Sung Lee, Singapore (SG); Sharad Singhal, Palo Alto, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 1209 days.

(21) Appl. No.: 13/283,981

(22) Filed: Oct. 28, 2011

(65) Prior Publication Data
US 2013/0111349 A1 May 2, 2013

(51) Int. Cl.
  G06F 3/048 (2013.01)
  G06F 9/50 (2006.01)

(52) U.S. Cl.
  CPC .................................. G06F 9/5072 (2013.01)

(58) Field of Classification Search
  None
  See application file for complete search history.

(56) References Cited

U.S. PATENT DOCUMENTS

| | | | |
|---|---|---|---|
| 7,424,722 B2 | 9/2008 | Joseph | |
| 2009/0276263 A1 | 11/2009 | Deb et al. | |
| 2010/0235539 A1* | 9/2010 | Carter et al. | 709/238 |
| 2010/0306772 A1 | 12/2010 | Arnold et al. | |
| 2011/0075667 A1 | 3/2011 | Li et al. | |
| 2011/0138050 A1* | 6/2011 | Dawson et al. | 709/226 |
| 2011/0153727 A1* | 6/2011 | Li | 709/203 |
| 2012/0254957 A1* | 10/2012 | Fork et al. | 726/6 |
| 2012/0304275 A1* | 11/2012 | Ji et al. | 726/11 |

OTHER PUBLICATIONS

"A Model-Based Proxy for Unified IaaS Management" Yan, et al. Oct. 29, 2010 (6 pgs.), Ontario, CA 4th International DMTF Academic Alliance Workshop on Systems & Virt. Mgmt.
"Generic Architecture for Cloud Infrastructure as a Service (IaaS) Provisioning Model" Release 1, Demchenko, et al., 27 pgs., Apr. 15, 2011 SNE.
"Model-based Planning for State-related Changes to Infrastructure and Software as a Service Instances in Large Data Centers," Hagen, et al. 6 pgs.
"A Scalable Availability Model for Infrastructure-as-a-Service Cloud" Longo et al., pp. 335-346, IEEE 2011.
"Open Cloud Computing Interface—Core" Nyren, et al., Jun. 21, 2011, 17 pgs., Open Grid Forum.
"Open Cloud Computing Interface—Infrastructure," Metsch et al., Jun. 21, 2011, 15 pgs., Open Grid Forum.
"Cloud Infrastructure Management Interface (CIMI) Model and REST Interfrace over HTTP," pp. 1-105, 2011 Distributed Management Task Force, Inc.

* cited by examiner

*Primary Examiner* — William Trapanese
(74) *Attorney, Agent, or Firm* — Leffert Jay & Polglaze, PA

(57) ABSTRACT

Service models may be generated in response to services exposed by two or more IaaS service providers, and an interface may be provided for selection and specification of the service models.

20 Claims, 5 Drawing Sheets

PROVISIONING IAAS SERVICES

BACKGROUND

Over the years, the number of cloud service providers who provide Infrastructure-as-a-Service (IaaS) has grown. IaaS generally involves a service provider outsourcing hardware to support operations, including virtualized compute, storage, networking and other information technology (IT) infrastructure resources, typically on a per-use basis. The service provider often owns the hardware and is typically responsible for hosting, operating and maintaining the equipment.

There is a shift in paradigm where users/organizations "rent" such virtualized infrastructure to deploy and run their applications and services without needing to worry about scalability and upfront costs. Users can rapidly provision virtualized IT infrastructure resources by using IaaS. However, IaaS presents its own concerns. For example, IaaS providers have occasionally experienced outages that have lasted for several hours, which can be unacceptable for mission critical applications/services.

For the reasons stated above, and for other reasons that will become apparent to those skilled in the art upon reading and understanding the present specification, there is a need in the art for alternative apparatus and methods for using IaaS services.

DETAILED DESCRIPTION

Figure 1:
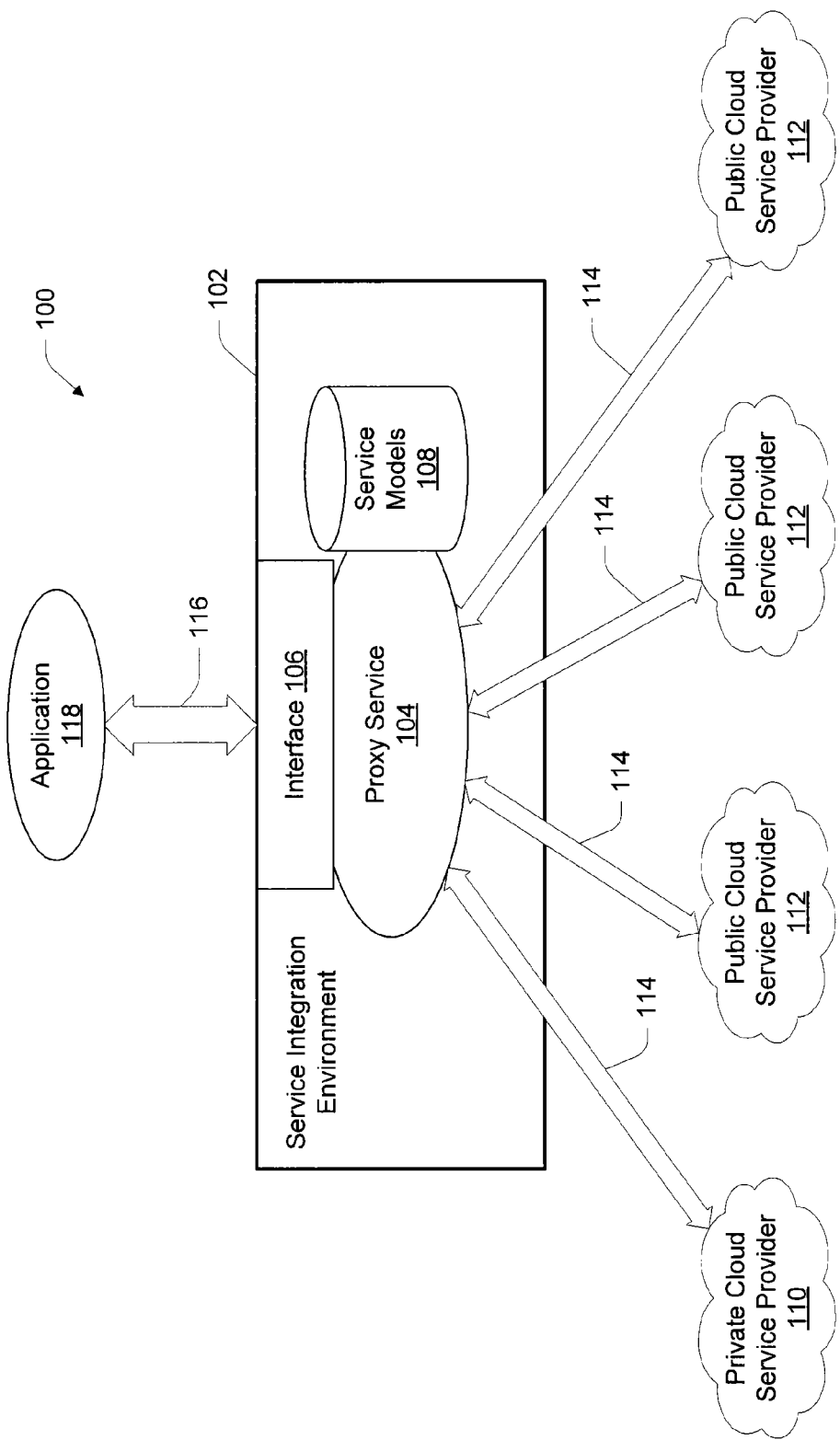
FIG. 1 is a modified block diagram of an example of a system for provisioning IaaS services across multiple service providers.

To address such problems, various implementations allow users to deploy their core business applications and/or services to multiple service providers for added redundancy to improve reliability and availability, for example. Various implementations provide a proxy service to support basic management functionality for IaaS from a variety of service providers, to provide a unified service to manage heterogeneous IaaS environments, and/or to provide the flexibility to switch from one IaaS service provider to another. Various implementations facilitate the use of multiple IaaS service providers, e.g., to use services available from alternative IaaS service providers to permit continued operation of services even when one of the IaaS service providers is not available, or to take advantage of pricing differences among IaaS service providers.

Various implementations use a model-based approach to service oriented computing to provide a solution for describing services and facilitating service integration. The DMTF (Distributed Management Task Force) Common Information Model (CIM) is a widely adopted object-oriented modeling tool for describing managed entities, e.g., compute or network entities. It provides a framework to enable description of resources provided by IaaS service providers. The CIM meta-model can be used to define the unified IaaS proxy service to model IaaS services. The IaaS proxy service can be implemented using Web2Exchange, a model-based service integration environment, to provision the unified IaaS management service for various IaaS service providers. Web2Exchange, as one example of a service integration environment, is available from Hewlett-Packard Company, Palo Alto, Calif., USA.

Service providers have used various approaches to expose their services across the Internet. Since multiple protocols exist to describe specifications for services, it can become difficult to understand service capabilities and orchestrate the invocations to multiple services. Model-based approaches to service-oriented computing may characterize services by their interfaces and their locations. The interfaces define what the services can do by defining a set of operations exposed by the service, and the location defines how the services can be accessed. Services can be described by service models in a structured way to facilitate service discovery and integration.

The services in the service integration environment can be modeled, for example, by an extension of the DMTF CIM meta-model and described by Managed Object Format (MOF) which is a readable and writable syntax to represent the service models. In some cases, service models may be defined directly in MOF with properties and operations as well as meta-data information in the form of qualifiers supported by the service integration environment. To simplify development, Web2Exchange, as one example of a service integration environment, has tools that can generate CIM models by run-time introspection of annotations in the service implementation. For example, an example service model might be specified in MOF as follows:

```
Class SIE_HelloWorldService : SIE_ManagedService {
    [Write(true)]
    String SampleProperty;
    String helloWorld(sint32 inParameter);
}
```

An equivalent Java annotation for the same service model might be written as:

```
@ExportClass
public class HelloWorldService extends ManagedService {
    @Export
    public String getSampleProperty( ){ ... }
    @Export
    public String helloWorld(int value){ ... }
}
```

Service models and modeled elements inherit from one root of the model, which may be referred to as Entity. The entities may be identified by a Unified Resource Identifier (URI) which can be used to locate the services in a service integration environment.

Web2Exchange includes foundation services, such as service catalogs, naming and directory services, to provide basic support services used by all other Web2Exchange services. Web2Exchange can enable services running on it to stay compatible with their models because it can generate the models by introspecting annotations present in the code at runtime, and therefore allows the models to evolve as the service implementation evolves over time.

Although the concepts of IaaS services provided by different IaaS service providers may be similar in terms of functionality, IaaS service providers can have different implementations, and therefore may not share a common interface or protocol for their services. Various implementations provide a translation layer between the user and the service provider in addition to composition services to allow interaction with different service providers.

FIG. 1 is a modified block diagram of an example of a system 100 for provisioning IaaS services across multiple service providers 110/112. The system 100 includes a service integration environment (SIE) 102. The SIE 102 provides the framework to enable description of resources provided by service providers 110/112. The SIE 102 includes the proxy service 104.

The proxy service 104 links to the service providers 110/112 and provides a translation layer to communicate with the various communication protocols used by the service providers 110/112. For example, different service providers 110/112 may use different sets of application program interface (API) calls to communicate equivalent information.

The service providers 110/112 can include one or more private cloud service providers 110 (e.g., infrastructure services available through private or dedicated networks) and/or one or more public cloud service providers 112 (e.g., infrastructure services available through public networks, such as the Internet). Although FIG. 1 depicts one private cloud service provider 110 and three public cloud service providers 112, various implementations can include more or less service providers 110/112 of either type. The service providers 110/112 are in communication with the proxy service 104 through communication links 114. Communication links 114 may include Hypertext Transfer Protocol Secure (HTTPS) communication links using Simple Object Access Protocol (SOAP), for example.

In general, a set of service models 108 may be created in SIE 102 for use by the proxy service 104. In accordance with model-based service integration environments, service models 108 can describe the actual state of the service at runtime, and permit reasoning about individual and composed services both at design time and at runtime. Service models 108 can represent live runtime instances, and can enable interoperability, versioning, extensibility and protocol independence. Since services from the service providers 110/112 may frequently be made available to allow users to rent the servers and storage in a pay-as-you-go manner, some common concepts can be extracted from IaaS services.

The proxy service 104 further provides an interface 106 for communication with a user, such as through a communication link 116 to an application 118. The interface 106 may be a Representational State Transfer (REST) interface. REST is a software architecture for distributed hypermedia systems such as the Internet. REST-style architectures include clients (e.g., application 118) and servers (e.g., SIE 102). Clients initiate requests to servers, which in turn process those requests and return responses. These requests and responses are in the context of the transfer of representations of resources, e.g., service models 108.

Figure 2:
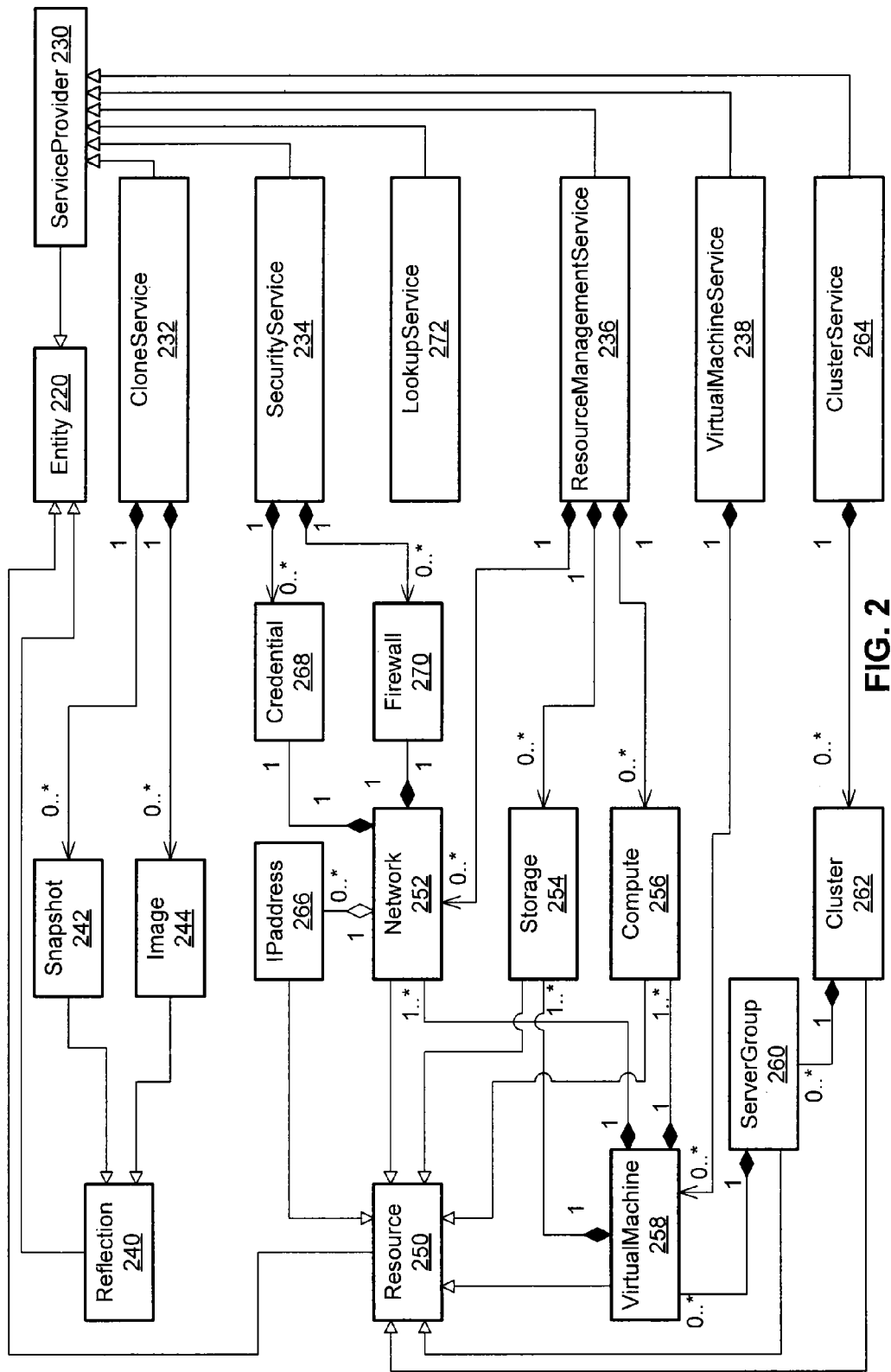
FIG. 2 depicts examples of abstraction models for use with a service integration environment.

FIG. 2 depicts examples of abstraction models of an implementation for use with a service integration environment, e.g., SIE 102. FIG. 2 may represent the service models 108 of FIG. 1, for example. FIG. 2 is depicted in Unified Modeling Language (UML). Open arrows indicate a generalization relationship, i.e., Snapshot 242 is a type of Reflection 240. Open diamonds indicate aggregation relationships. In an aggregation relationship, a classifier (e.g., a part classifier) is depicted as a part of, or as subordinate to, another classifier (e.g., a whole classifier). For example, an IP address 266 may be part of a Network 252. However, in an aggregation relationship, each part classifier and aggregate classifier have separate existences. For example, a Network 252 can exist without an IP address 266, and IP addresses 266 can exist independently of any Network 252. Closed diamonds indicate composition relationships. A composition relationship specifies that the lifetime of the part classifier is dependent on the lifetime of the whole classifier. For example, a Firewall 270 exists only as long as its Network 252 exists. Connections with a closed diamond at one end and an arrow at the other end indicate management relationships. For example, zero or more Virtual Machines 258 are managed by one Virtual Machine Service 238.

The UML depiction of FIG. 2 further indicates the number of occurrences that may exist between whole and part classifiers. For example, for every Network 252, there is one Firewall 270, and vice versa; for every Network 252, there are zero or more occurrences of IP address 266; and for every Virtual Machine 258, there are one or more occurrences of Storage 254.

The abstraction models of FIG. 2 contain models for both types and services, consistent with a model-based approach. Both classes of models extend the root, Entity 220, and models of services further extend Service Provider 230 which itself extends Entity 220. The type models provide parameters as well as information about instances of types which are exposed by a set of services during service invocations. Models of services provide basic functionalities to fulfill operational requests. The type models and models of services, along with the root Entity 220 and Service Provider 230, may collectively be referred to herein as service models. Service models may be generated in response to the services exposed to the proxy service 104 by service providers.

For the example shown in FIG. 2, models of services for various basic categories include Clone Service 232, Security Service 234, Resource Management Service 236, Virtual Machine Service 238 and Cluster Service 264.

Clone Service 232 may provide both creation and deletion of compute Images 244 and storage Snapshots 242, so that at the time of disaster recovery, appropriate images or snapshots can be restored to Computes 256 and Storages 254. Security Service 234 may provide functionalities of generating Credentials 268 and Firewall 270 settings, and may further support revoking Credentials 268 as well as updating Firewall 270 configurations. Resource Management Service 236 may define operations for lifecycle management, such as creating, deleting, starting and stopping a resource. It may also define the operations for querying and searching, and special functional operations, such as creating Compute 256 from an Image 244 and restoring Storage 254 from Snapshots 242. Virtual Machine Service 238 may define operations for Virtual Machines 258 in the context of lifecycle management and querying, and may also specify operations for flexibly attaching or detaching resources as well as for monitoring and billing purpose. Cluster Service 264 may provide creation and deletion of collections of Virtual Machines 258.

Models of services of various implementations may further include Lookup Service 272, which may be used to retrieve global configurations of service providers, and may further be used to identify restrictions of a resource usage, for example. Example attributes of the models of services depicted in FIG. 2 are detailed in Table 1.

TABLE 1

Models of Services

| Model | Attributes |
|---|---|
| CloneService 232 | +getReflection(in id : int) : Reflection<br>+createReflection(in request : Reflection) : Reflection<br>+deleteReflection(in id : int) : string |
| SecurityService 234 | +checkAPICredential(in credential : Credential) : string<br>+getAccessCredential(in id : int) : Credential<br>+createAccessCredential(in request : Credential) : Credential<br>+revokeAccessCredential(in id : int) : string<br>+getFirewall(in id : int) : Firewall<br>+createFirewall(in request : Firewall) : Firewall<br>+deleteFirewall(in id : int) : string<br>+configureFirewall(in settings : Firewall) : Firewall |
| LookupService 272 | +getRegions( ) : string[ ]<br>+getAvailabilityZones(in region : string) : string[ ]<br>+getImageAvailableConfigs(in imgId : int, in arch : string) : string[ ]<br>+getStorageAttachableVMIds(in availabilityZone : string) : string[ ] |
| ResourceManagementService 236 | +getResource(in id : int) : Resource<br>+createResource(in request : Resource) : Resource<br>+deleteResource(in id : int) : string<br>+getAvailableIPs(in region : string) : IPaddress<br>+createResourcefromReflecton(in source : Reflection) : Resource |
| VirtualMachineService 238 | +getVM(in id : int) : VirtualMachine<br>+createVM(in request : VirtualMachine) : VirtualMachine<br>+deleteVM(in id : int) : string<br>+startVM(in id : int) : string<br>+stopVM(in id : int) : string<br>+attachResource(in source_id : int, in target_id : int) : string<br>+detachResource(in source_id : int, in target_id : int) : string<br>+monitorVM(in id : int, in specification : string) : string[ ]<br>+getVMBilling(in id : int) : string |
| ClusterService 264 | +getCluster(in id : int) : Cluster<br>+createCluster(in request : Cluster) : Cluster<br>+deleteCluster(in id : int) : string<br>+startCluster(in id : int) : string<br>+stopCluster(in id : int) : string<br>+attach(in source_id : int, in target_id : int) : string<br>+detach(in source_id : int, in target_id : int) : string<br>+monitorCluster(in id : int, in specification : string) : string[ ]<br>+getClusterBilling(in id : int) : string |

The type models are generated in response to service invocations. Resource 250 may include sub-types Network 252, IP Address 266, Storage 254, Compute 256, and Virtual Machine 258, which may be composites of various resources that may be provided by service providers. Reflection 240 may be used for backup and disaster recovery, and may include Snapshot 242 for Storage 254 and Image 244 for Compute 256. Additional type models may support security purposes, including Credential 268 and Firewall 270. The Virtual Machine 258 is a particular type of resource that is a collection of individual resources, and this kind of modeling is generic in the sense that it supports modeling of virtual machines composed of multiple Networks 252, multiple Storages 254 and multiple Computes 256, and even multiple Virtual Machines 258. A collection of Virtual Machines 258 may be referred to as Server Group 260, and a collection of Server Groups 260 may be referred to as Clusters 262, which can also be modeled in this approach. Example attributes of the type models depicted in FIG. 2 are detailed in Table 2.

TABLE 2

Type Models

| Model | Attributes |
|---|---|
| Reflection 240 | −Id : int<br>−Owner : int<br>−ReflectionType : string |

TABLE 2-continued

Type Models

| Model | Attributes |
|---|---|
| | −Location : string |
| | −Status : string |
| | −Visibility : string |
| | −CreatedTime : string |
| | −UpdatedTime : string |
| | −Description : string |
| Snapshot 242 | −Progress : float |
| Image 244 | −CPU_Cores : int |
| | −CPU_Speed : float |
| | −CPU_Arch : string |
| | −Memory : float |
| | −Platform : string |
| Resource 250 | −Id : int |
| | −Owner : int |
| | −ResourceType : string |
| | −Location : string |
| | −Status : string |
| | −createdTime : string |
| | −Version : float |
| | −Description : string |
| Network 252 | −IPs : IPaddress[ ] |
| | −AllocationType : string |
| IPaddress 266 | −Address : string |
| | −Subnet : string |
| Storage 254 | −Size : float |
| | −Host : string |
| | −DeviceType |
| | −Utilization : float |
| | −Snapshots : Snapshot[ ] |
| Compute 256 | −CPU_Cores : int |
| | −CPU_Speed : float |
| | −CPU_Arch : string |
| | −Memory : float |
| | −Platform : string |
| | −ImageId : int |
| VirtualMachine 258 | −Computes : Compute[ ] |
| | −Storages : Storage[ ] |
| | −Networks : Network[ ] |
| | −VirtualMachineType : int |
| ServerGroup 260 | −Virutal Machines : VirtualMachine[ ] |
| Cluster 262 | −ServerGroups : ServerGroup[ ] |
| Credential 268 | −Id : int |
| | −Access Key : string |
| | −SecretKey : string |
| | −Privilege : string |
| | −Status : string |
| | −Description : string |
| Firewall 270 | −Id : int |
| | −Description : string |
| | −Status : string |
| | −Configuration : string |

The implementations for invocations between services and various IaaS service providers may be transparent to end users. The user might only be made aware of the common interface provided by the proxy service to communicate with all the supported service providers. For various implementations, invocations to a particular service provider can be designed so that it is possible to support a variety of types of service providers without modifying service models.

The service models can be thought of as building blocks, each describing a particular functionality to be selected and specified by a user (e.g., application 118) to meet its infrastructure requirements. The user is presented with a single interface (e.g. interface 106) for the selection and specification of the service models to meet its infrastructure requirements. In response to the selection and specification of the various service models, the proxy service 104 can select services from one or more of the service providers 110/112 to satisfy the specified parameters for the selected models based on their services exposed to the proxy service 104 through communication link 114, and generate the type models for exposure to the application 118 through Entity 220. Entity 220 serves as the returned value of a service call, and may be refreshed upon the completion of each service call.

The proxy service 104 further provides the communication between the various selected services based on the model description (e.g., as depicted in the example of FIG. 2), and can dispatch the appropriate API service calls to the service providers 110/112 corresponding to the selected services in response to requests from the application 118 for resources. The selection of services by the proxy service 104 may be prioritized based on preferred service providers, preferred geographical regions, historical reliability indications, redundancy preferences, cost, etc.

Figure 3:
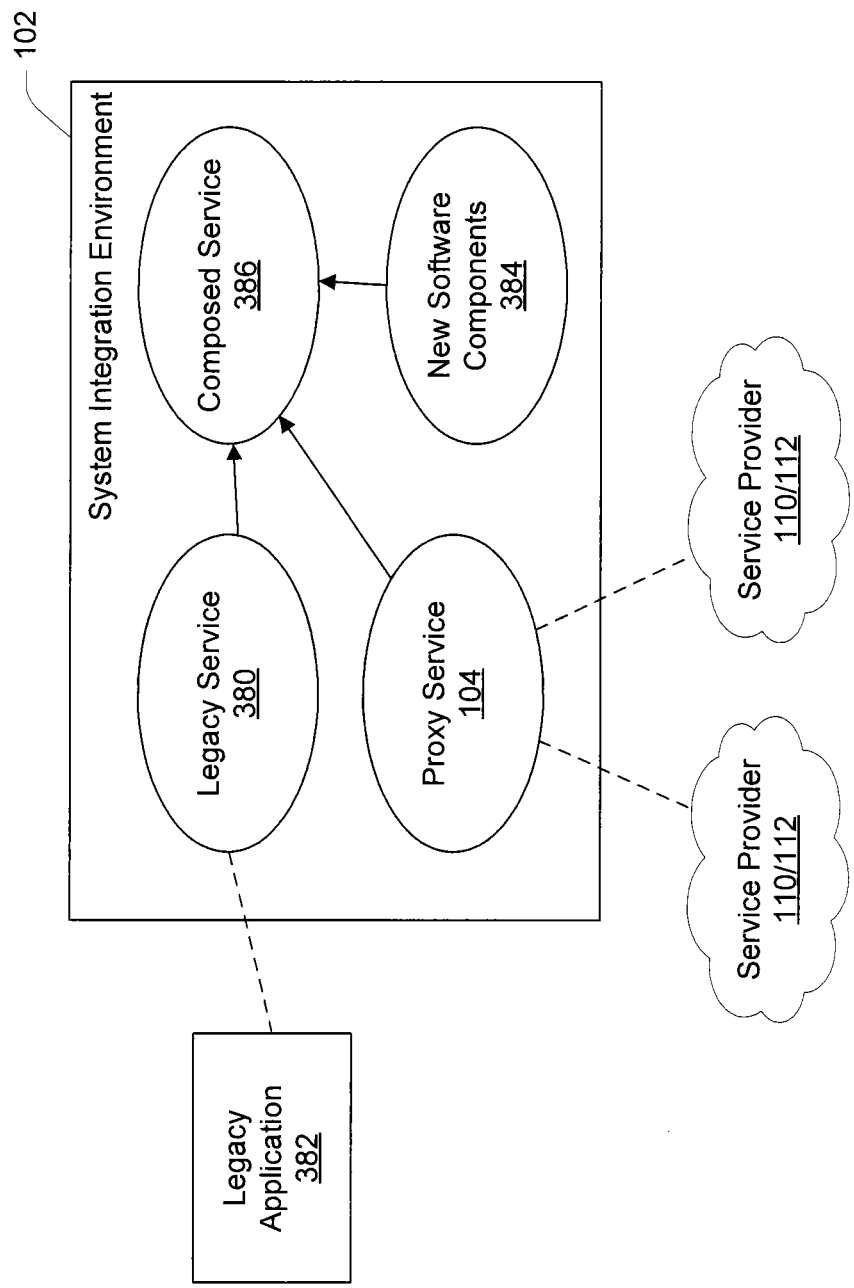
FIG. 3 is a modified block diagram depicting the interaction of a proxy service in generating composed services in accordance with an example implementation.

Implementing the proxy service 104 in SIE 102 can further facilitate a reduction in the complexity of integrating infrastructure services with legacy applications and new software components, especially for a heterogeneous environment where invocations may happen among multiple IaaS service providers. FIG. 3 is a modified block diagram depicting the interaction of a proxy service in generating composed services.

For various implementations, there may be four types of services within an SIE 102, e.g., legacy services 380 for legacy applications 382, new software components 384 written within the SIE 102, proxy service 104, and composed service 386. Legacy service 380 and proxy service 104 may be proxies that bind service models (not shown in FIG. 3) to the back-end implementations, i.e., to legacy application 382 and service providers 110/112, respectively. Service providers 110/112 may include private cloud service providers and/or public cloud service providers. New software components 384 may represent additional functionalities written within the SIE 102 itself.

Legacy service 380, proxy service 104, and new software components 384 may be associated with different sets of service models, and their associated type models. By selecting and specifying service and type models from one or more of legacy service 380, proxy service 104 and new software components 384, a composed service 386 can be generated, providing functionality that may be unavailable from any one of the other services 104/380/384.

Figure 4:
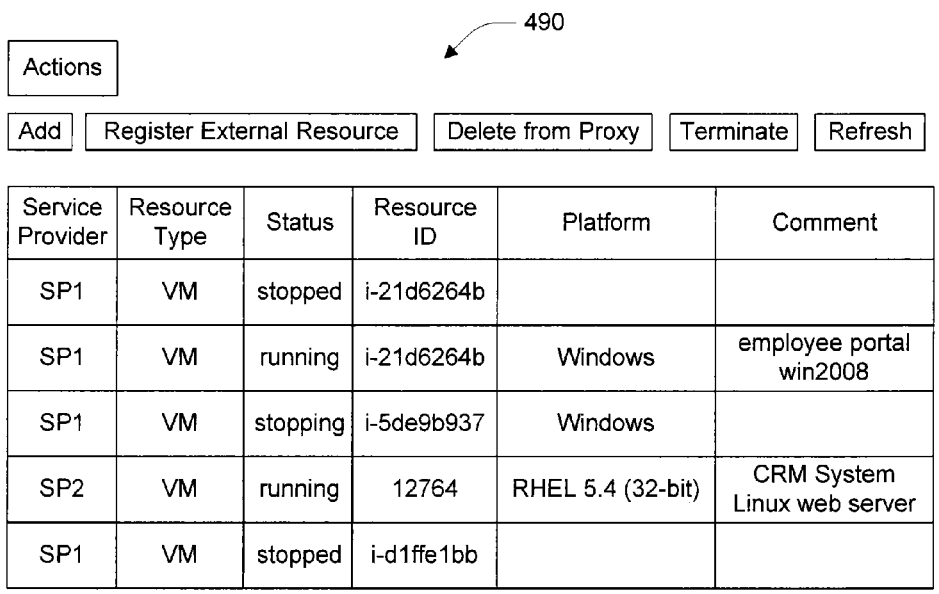
FIG. 4 depicts an example representation of a management console for use with various implementations.

With the common interface provided by proxy service 104, a management console may be provided to subscribe, provision, monitor and/or manage IaaS resources from multiple service providers. The management console may be an instance of application 118. FIG. 4 depicts an example representation of a management console 490 for use with various implementations herein. The management console 490 might be displayed to a user through a web browser or other graphical user interface (not shown). As depicted in FIG. 4, management console might provide a list of various resource types associated with the proxy service 104, their statuses, their corresponding service providers, the service providers' resource IDs and platforms, and descriptive comments. The user may further be presented with a set of actions that can be taken, such as to add a resource, register an external resource, delete a resource from the proxy service, terminate a resource, or refresh the management console.

It will be appreciated that implementations of the present disclosure can be instantiated by machine-readable instructions, e.g., software, configured to cause a processor to perform methods disclosed herein. The machine-readable instructions can be stored on tangible storage media in the form of volatile or non-volatile storage that is non-transitory in nature. Examples of storage media include solid-state memory (e.g., Read-Only Memory (ROM), Random-Access Memory (RAM), Flash memory, etc.); optical media (e.g., CD, DVD, Blu-Ray™ disks, etc.), magnetic media (e.g., magnetic disks and disk drives, magnetic tape, etc.). Such storage media may be a component part of a computer system, or it may include a removable storage medium.

Figure 5:
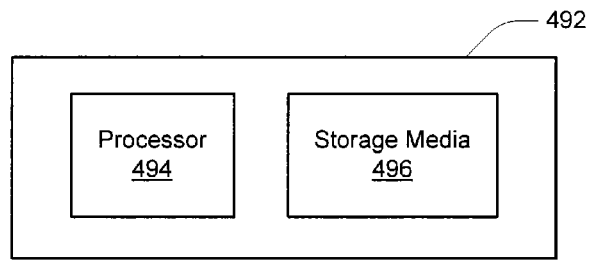
FIG. 5 is a block diagram of an example of a computer system for use with various implementations.

FIG. 5 is a block diagram of an example of a computer system 492 having a processor 494 and a tangible storage media 496 in communication with the processor 492 for use with various implementations. The storage media 496 includes a tangible storage medium and has machine-readable instructions stored thereon configured to cause the processor 494 to perform methods disclosed herein. The storage media 496 may further have the service models 108 stored thereon. The storage media 496 may include more than one form of tangible storage media, and the machine-readable instructions and service models may each be stored in a separate storage medium of storage media 496.

Figure 6:
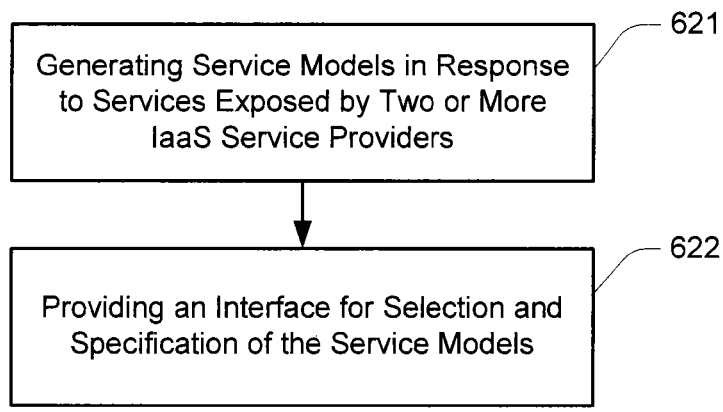
FIG. 6 is a flowchart of an example of a method of provisioning IaaS services.

FIG. 6 is a flowchart of an example of a method of provisioning IaaS services. At 621, service models are generated in response to services exposed by two or more IaaS service providers. And at 622, an interface is provided for selection and specification of the service models.

Figure 7:
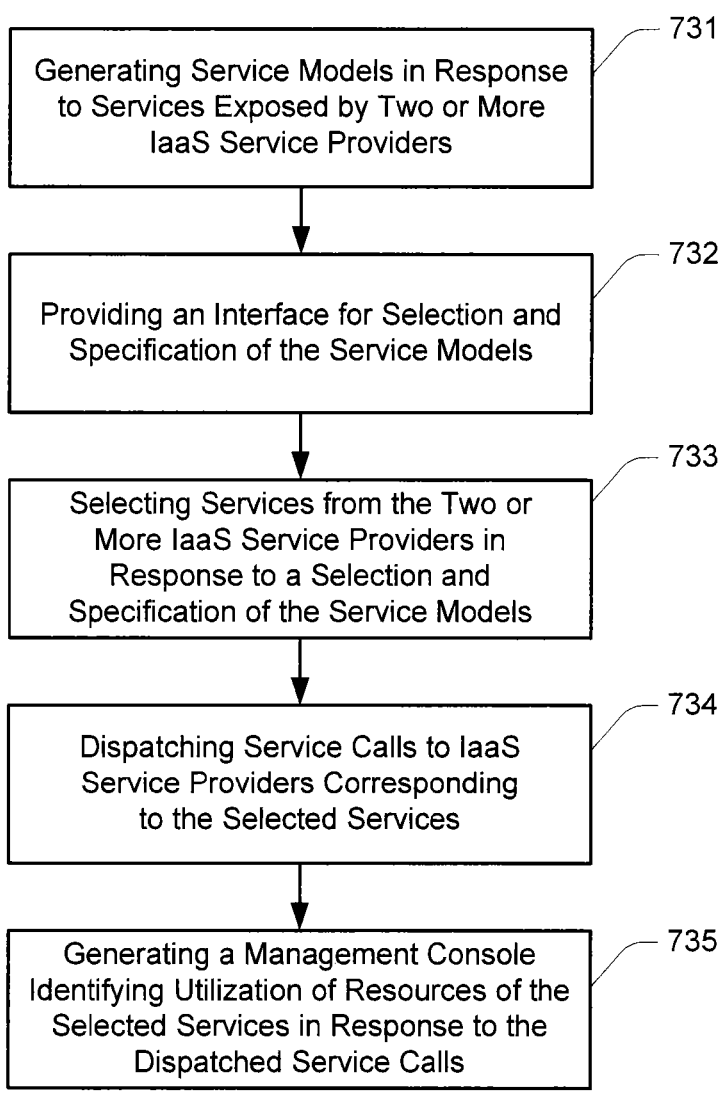
FIG. 7 is a flowchart of another example of a method of provisioning IaaS services.

FIG. 7 is a flowchart of another example of a method of provisioning IaaS services. At 731, service models are generated in response to services exposed by two or more IaaS service providers. At 732, an interface is provided for selection and specification of the service models. At 733, services are selected from the two or more IaaS service providers in response to a selection and specification of the service models. At 734, service calls are dispatched to IaaS service providers corresponding to the selected services. And at 735, a management console identifying utilization of resources of the selected services is generated in response to the dispatched service calls.

What is claimed is:

1. A method for provisioning Infrastructure-as-a-Service (IaaS) services, comprising:
   generating service models in response to services exposed by two or more IaaS service providers, wherein the service models describe corresponding exposed services by interfaces and locations of those corresponding services; and
   providing an interface for selection and specification of the service models.

2. The method of claim 1, further comprising:
   selecting services from the two or more IaaS service providers in response to a selection and specification of the service models; and
   dispatching service calls to IaaS service providers corresponding to the selected services.

3. The method of claim 2, wherein selecting services from the two or more IaaS service providers in response to a selection and specification of the service models comprises prioritizing the selection of services based on one or more parameters selected from the group consisting of preferred service providers, preferred geographical regions, historical reliability indications, redundancy preferences, and cost.

4. The method of claim 2, wherein dispatching service calls to IaaS service providers comprises dispatching service calls over Hypertext Transfer Protocol Secure (HTTPS) communication links.

5. The method of claim 1, wherein generating service models in response to services exposed by two or more IaaS service providers comprises generating service models in response to services exposed by two or more IaaS service providers using two or more sets of application program interface (API) calls to communicate equivalent information.

6. The method of claim 1, wherein providing an interface for selection and specification of the service models comprises providing a single interface.

7. The method of claim 1, wherein generating service models in response to services exposed by two or more IaaS service providers comprises generating service models for creation and deletion of compute images and storage snapshots, for generating security credentials and firewall settings, for defining lifecycle management of resources, and/or for specifying operations for attaching or detaching resources.

8. The method of claim 7, wherein generating service models in response to services exposed by two or more IaaS service providers further comprises generating service models for revoking security credentials and updating firewall configurations, defining operations for querying service providers and searching for resources, for monitoring and billing purposes, for retrieving global configurations of service providers, and/or for identifying restrictions of a resource usage.

9. The method of claim 1, wherein providing an interface for selection and specification of the service models comprises providing a Representational State Transfer (REST) interface.

10. The method of claim 1, further comprising:
    generating a management console identifying utilization of resources of the selected services in response to the dispatched service calls.

11. The method of claim 10, wherein generating a management console further comprises presenting a set of actions selected from the group consisting of adding a resource, registering an external resource, deleting a resource from a proxy service, terminating a resource, and refreshing a display of the management console.

12. A method for provisioning Infrastructure-as-a-Service (IaaS) services, comprising:
    generating service models in response to services exposed by two or more IaaS service providers, wherein the service models describe corresponding exposed services by interfaces and locations of those corresponding services;
    providing an interface for selection and specification of the service models;
    selecting services from the two or more IaaS service providers in response to a selection and specification of the service models;
    dispatching service calls to IaaS service providers corresponding to the selected services; and
    generating a management console identifying utilization of resources of the selected services in response to the dispatched service calls.

13. The method of claim 1, wherein the interface of a particular service model defines a set of operations exposed by the service corresponding to the particular service model.

14. The method of claim 1, wherein the location of a particular service model defines how the service corresponding to the particular service model can be accessed.

15. The method of claim 1, further comprising generating a particular service model by introspecting annotations present in code of the corresponding service at runtime of that service.

16. An apparatus for provisioning Infrastructure-as-a-Service (IaaS) services, comprising:
    a processor; and storage media in communication with the processor, wherein the storage media has machine-readable instructions stored thereon configured to cause the processor to perform a method, the method comprising:

provide a translation layer for communication with two or more IaaS service providers using two or more communication protocols;

generating service models in response to services exposed by the two or more IaaS service providers, wherein the service models describe corresponding exposed services by interfaces and locations of those corresponding services; and providing an interface for selection and specification of the service models.

17. The apparatus of claim 16, wherein the machine-readable instructions are further configured to cause the processor to perform a method comprising:

selecting services from the two or more IaaS service providers in response to a selection and specification of the service models; and dispatching service calls to IaaS service providers corresponding to the selected services.

18. The apparatus of claim 16, wherein the storage media further has the service models stored thereon.

19. The apparatus of claim 16, wherein the interface of a particular service model defines a set of operations exposed by the service corresponding to the particular service model, and wherein the location of the particular service model defines how the service corresponding to the particular service model can be accessed.

20. The apparatus of claim 16, wherein the machine-readable instructions are further configured to cause the processor to generate a particular service model by introspecting annotations present in code of the corresponding service at runtime of that service.

* * * * *